United States Patent [19]

Badertscher et al.

[11] Patent Number: 5,393,549
[45] Date of Patent: Feb. 28, 1995

[54] PREPARATION OF AERATED FAT-CONTAINING FOODS

[75] Inventors: Ernest Badertscher, Orbe; Marianne Bruelhart, Stetten, both of Switzerland

[73] Assignee: Nestec S.A., Vevey, Switzerland

[21] Appl. No.: 888,238

[22] Filed: May 21, 1992

[30] Foreign Application Priority Data

Jun. 14, 1991 [EP] European Pat. Off. ............ 91109769

[51] Int. Cl.⁶ .................................................. A23P 1/16
[52] U.S. Cl. ..................................... 426/564; 426/572; 426/603; 426/659; 426/660
[58] Field of Search ............... 426/660, 564, 566, 572, 426/659, 603

[56] References Cited

U.S. PATENT DOCUMENTS

| | | | |
|---|---|---|---|
| 4,323,588 | 4/1982 | Vink | 426/564 |
| 4,431,682 | 2/1984 | Smith | 426/659 |
| 4,668,520 | 5/1987 | Okonogi | 426/564 |
| 4,698,232 | 10/1987 | Sheu | 426/572 |
| 4,714,620 | 12/1987 | Bunick | 426/660 |
| 4,818,554 | 4/1989 | Giddey | 426/564 |
| 4,851,239 | 7/1989 | Amen | 426/564 |
| 4,889,738 | 12/1989 | Hara | 426/660 |
| 5,004,623 | 4/1991 | Giddey | 426/660 |
| 5,112,626 | 5/1992 | Huang | 426/566 |
| 5,126,160 | 6/1992 | Giddey | 426/564 |
| 5,154,942 | 10/1992 | Herschey | 426/659 |
| 5,244,675 | 9/1993 | Talignani | 426/660 |

OTHER PUBLICATIONS

Minifie 1989 Chocolate, Cocoa and Confectionary: Science & Technology Third ed. AVI New York 138–150.

*Primary Examiner*—Carolyn Paden
*Attorney, Agent, or Firm*—Vogt & O'Donnell

[57] ABSTRACT

Aerated fat-containing food products are prepared by mixing a fat with a refinable food additive so that the mixture contains a maximum of 30% by weight fat, refining the mixture to reduce the size of particles in the mixture to a maximum of 30 μm, and then aerating the refined mixture.

22 Claims, No Drawings

PREPARATION OF AERATED FAT-CONTAINING FOODS

BACKGROUND OF THE INVENTION

This invention relates to an easy-spreading food product, preferably low in fats and sugar, and to a process for its production.

It is known from U.S. Pat. No. 3,969,534 that a low-fat fermented milk product having a long shelf life at ambient temperature can be produced by heating a mixture of a fermented milk base and a stabilizer, such as starch, at a temperature of 38° to 65° C., homogenizing the heated mixture and then pasteurizing it at 76° to 93° C. In addition, it is known from U.S. Pat. No. 4,569,846 that a fermented milk product, which keeps in a tube at 5° C. or at 20° C. and which can easily be squeezed out from its tube without any loss of cohesion, can be produced by lactic fermentation of an oil-in-water emulsion containing a fat and a skimmed milk product and/or soya proteins.

SUMMARY OF THE INVENTION

The problem addressed by the present invention was to provide a food product low in fats and sugar, advantageously in expanded and aerated form with a light texture.

Accordingly, the present invention relates to a food product in aerated form comprising a refined mixture of a refinable additive and a fat, the mixture containing at most 30% by weight free fats before refining and the refined mixture having a maximum particle size of 30 μm. The food product according to the invention may be in the form of an easy-spreading paste or in the form of a hard and brittle slab or bar.

Another problem addressed by the invention was to provide a process for the production of this food product. Accordingly, the present invention relates to a process for the production of a food product in which a mixture containing at least one fat and a refinable additive is prepared, the mixture containing at most 30% by weight free fats, the mixture thus prepared is refined to a particle size of at most 30 μm and the refined mixture is aerated.

One advantage of the invention is that it enables a microbiologically stable product containing very little water and having a long storage life at ambient temperature to be obtained. Another advantage is that the product obtained can be enriched with fibre and/or nutrients, such as vitamins and mineral salts. A further advantage is that the product obtained can be flavoured, for example by addition of flavourings, chocolate, fruit.

DETAILED DESCRIPTION OF THE INVENTION

In the following, parts and percentages are by weight.

In the process according to the invention, a mixture containing at least one fat and a refinable additive is prepared. The fat may be a fat of lactic or vegetable origin, such as for example a butter oil, a sunflower oil, a soybean oil or a mixture of various fats. The fats may be selected according to their melting point and according to the desired consistency of the end product.

For example, a mixture of 30 to 40% fats solid at 20°–25° C. and 60 to 70% fats liquid at 20°–25° C. may be used for a highly fluid and unctuous product, while a mixture of 85 to 95% solid fats and 5 to 15% liquid fats may be used where a harder end product, for example of the crunchy bar type, is required.

The additive may be any refinable additive, i.e., any additive of which the size of the solid particles may be reduced by smoothing, such as for example fibres, sugars and/or a fermented base.

Thus, in one particular embodiment of the process according to the invention, a mixture containing 2 to 4 parts lactic fats, 0.5 to 2 parts vegetable fats, 4 to 7 parts edible fibre and 0 to 1 part nutrients, such as mineral salts and vitamins may be prepared, the mixing process being carried out at a temperature of 40° C. in a planetary mixer, a kneader or any other mixer capable of working paste-like mixtures.

In a second particular embodiment of the process according to the invention, a mixture containing 0.5 to 3 parts lactic fats, 0.5 to 5 parts vegetable fats, 1 to 3 parts of a fermented base and 2 to 4 parts of at least one sugar, such as sucrose, may be prepared.

The fermented base may be obtained by fermentation of an acidified premix containing in particular a milk-based material and a hydrolyzed cereal. The milk-based material may be, for example, skimmed milk and/or whey proteins. The hydrolyzed cereal may be, for example, an amylaceous material, such as grits, a flour or a starch of a cereal or mixture of cereals or any other vegetable material rich in starch which has been hydrolyzed, more particularly an enzymatically hydrolyzed cereal as described in European Patent No. 31 050. The hydrolyzed cereal preferably has a DE (dextrose equivalent) of the order of 30 to 35.

For example, the acidified premix may contain (in parts by weight of dry matter) 5 to 10 parts hydrolyzed cereal, 8 to 20 parts skimmed milk and/or whey proteins and 0 to 5 parts lactic and/or vegetable fats to which water may be added in a quantity sufficient to give a dry matter content of approximately 25 to 35% by weight to ensure correct fermentation.

Fermentation of the premix may be carried out with a yoghurt culture for about 3 to 5 hours at 40° to 45° C. until a pH value of 4.2 to 5.0 is obtained. The fermented premix may then be pasteurized and dried, for example by spray-drying, to obtain a fermented base having a dry matter content of 95 to 98% by weight.

Mixing of the fat, preferably softened beforehand to 40°–60° C., and the additive may be carried out in a planetary mixer or a kneader at a temperature of 40° to 60° C. The mixture obtained may be worked for 2 to 10 minutes at a speed of 50 to 80 revolutions per minute and at a temperature of 40° to 60° C. in order to obtain a mixture having a homogeneous consistency.

Nutrients, such as mineral salts and/or vitamins, flavourings, such as cinnamon or vanilla, cocoa powder, fruit pulp, may be added to the mixture thus prepared.

The mixture thus prepared is refined, for example in a refiner comparable with those used in the manufacture of chocolate. Refining comprises reducing the size of the particles of solid material in the fat by smoothing so that they are impalpable to the tongue during consumption of the product. The particles are reduced to a maximum size of approximately 30 μm, for example by passing the mixture through a three- or five-cylinder refiner under a pressure of 8 to 12 bar and at a temperature of 40° to 60° C.

In cases where the particles of solid material present in the mixture after the first pass through the refiner are larger in size than desired, the mixture may be passed through the refiner a second or even third time under the same temperature and pressure conditions. A refined mixture having a maximum particle size of approximately 30 μm is thus obtained, generally being present in the form of small flakes comparable with pieces of grated chocolate.

Before the aeration step, or during the aeration as exemplified below, fats may be added to the refined mixture in a quantity of 0.1 to 3 parts per part refined mixture. A vegetable fat of high thermal stability is preferably added in such a quantity that the total quantity of fats in 10 parts end product is at least 3 parts, at least 25% of this total being made up by vegetable fats of high thermal stability, i.e., having a melting point of at least 32° C. The function of the fats is to form a solid crystalline network so that the air incorporated in the product during aeration can be retained therein, enabling the end product to keep the appearance of aerated foam.

If the end product is to be obtained in a hard, brittle form, the total fats should comprise 80 to 95% fats having a melting point of at least 32° C.

The refined mixture is then aerated. Aeration comprises beating the product into a foam, i.e., introducing air, to obtain a light and aerated texture. Aeration may be carried out using a planetary mixer equipped with a beater and rotating at a speed of 80 to 120 r.p.m. or a scraped-surface heat exchanger. Aeration is preferably carried out at a temperature of 20° to 25° C. It has been found in this connection that, when aeration is carried out at a temperature below 20° C., the mixture becomes hard and is not easy to beat. When aeration is carried out at a temperature above 25° C., the mixture becomes fluid and is unable to retain the air incorporated therein by beating. Aeration may be carried out for 1 to 3 minutes to obtain an end product having an apparent density of 700 to 900 gl$^{-1}$.

In the first embodiment of the process, the end product obtained contains fats, fibre and nutrients, has a light and aerated texture and spreads easily. This product may thus consist of a refined mixture containing 2 to 4 parts lactic fats, 0.5 to 2 parts vegetable fats, 4 to 7 parts edible fibre and 0 to 1 part nutrients and of 0.1 to 3 parts fats per part refined mixture. This end product preferably contains 30 to 80% fats and may therefore be used as a butter or margarine substitute. In addition, it contains hardly any water and keeps for long periods at ambient temperature.

In the second embodiment of the process, the end product is a complete product which is low in fats and sugar, enriched with nutrients and easy to spread, for example on a slice of bread. This product may thus consist of a refined mixture containing 0.5 to 3 parts lactic fats, 0.5 to 5 parts vegetable fats, 1 to 3 parts of a fermented base and 2 to 4 parts sugar and of 0.1 to 3 parts fats per part refined mixture. The product thus obtained may then be packed, preferably immediately after its production when the product as a whole is still "flexible", so that fixing of the structure and texture of the product due to crystallization of the fats it contains take place in the pack.

EXAMPLES

The invention is illustrated by the following Examples.

Example 1

250 g butter oil and 50 g sunflower oil are mixed in a planetary mixer at 40° C., and 700 g edible fibre, vitamins A, C and E and mineral salts are added to the mixture thus prepared. The further mixture is worked for about 5 minutes at a speed of 60 r.p.m. to obtain a homogeneous consistency, the temperature being kept at 40° C.

The mixture thus worked is introduced into a three-cylinder refiner in which a pressure of 10 bar and a temperature of 40° C. are maintained. The mixture is passed over the cylinders twice to obtain a particle size of approximately 28 μm. The resulting product is in the form of flakes similar to chocolate gratings. The refined mixture is then introduced into a planetary mixer equipped with a beater and is aerated for about 2 minutes at a temperature of 22° to 23° C. and at a speed of 100 r.p.m. to obtain an apparent density of 800 gl$^{-1}$. 275 g butter oil are added during aeration.

The aerated product obtained contains 45% fats and less than 1% water and has a water activity of 0.3. This product is easy to spread, for example on a slice of bread.

Example 2

A premix containing 1.0 kg skimmed milk powder, 200 g butter oil, 600 g wheat flour enzymatically hydrolyzed beforehand by the method described in European Patent No. 31 050 and having a dry matter content of 40%, 100 g peanut oil and 3.3 l water to obtained a dry matter content of approximately 30% is first prepared. A commercially available culture of *Streptococcus thermophilus* and *Lactobacillus bulgaricus* is added to the premix thus obtained. The premix is then left to ferment for 4 hours at 42° C. until a pH value of 4.5 is obtained. The fermented premix is then spray-dried at 90° C. to form a fermented base having a dry matter content of 97%.

0.5 kg vegetable fat marketed under the name of BISCUITINE-N by SAIS, 0.5 kg butter oil and 0.5 kg sunflower oil softened beforehand at 40° C. are mixed in a planetary mixer, and 2.0 kg fermented base prepared as described above, 3.0 kg sucrose and 0.5 kg strawberry powder are then added and the mixture thus formed is worked for 5 minutes at 60 r.p.m./40° C.

The worked mixture is then refined in a five-cylinder refiner under a pressure of 10 bar and at a temperature of 40° C. A product in the form of small flakes with a maximum particle size of 30 μm is obtained at a temperature of 40 to 42° C.

The refined mixture is then introduced into a planetary mixer equipped with a beater and is aerated at a temperature of 22° to 23° C. and at a speed of 100 r.p.m. During aeration of the mixture, 3.0 kg BISCUITINE-N are added to hold the air incorporated in the product and to keep its foam-like appearance.

The aearated product obtained, which spreads easily, has an apparent density of 800 gl$^{-1}$, contains 0.85% water for an Aw of 0.3 and can be packed immediately in glass pots.

Example 3

1.5 kg BISCUITINE-N softened beforehand at 40° C., 1.6 kg fermented base prepared in accordance with Example 2, 3.0 kg sucrose, 0.7 kg cocoa powder having a dry matter content of 96% by weight, 0.07 kg mineral salts and vitamins, mainly A, D and E, and 0.1 kg of an active yoghurt powder are mixed in a planetary mixer. The mixture is worked at for 5 minutes at 60 r.p.m./50° C. and then refined in a five-cylinder refiner under a pressure of 10 bar at temperature of 45° C. A mixture in the form of small flakes having a maximum particle size of 30 $\mu$m is obtained. 3.0 kg BISCUITINE-N are added to the mixture which is then aerated in a scraped-surface heat exchanger at a temperature of 30° C.

A hard and brittle aerated product is obtained after complete cooling.

We claim:

1. A process for preparing an aerated fat-containing food product comprising:
    mixing a fat with a fermented base which comprises a mix of a fermented acidified milk-based material and a fermented hydrolyzed amylaceous material in amounts to obtain a fat and fermented base mixture which contains a maximum of 30% by weight fat;
    refining the mixture to reduce a size of particles in the mixture to obtain a refined mixture wherein the particles have a maximum size of about 30 $\mu$m; and
    aerating the refined mixture.

2. A process according to claim 1 wherein the amylaceous material is a hydrolyzed cereal which has a DE of from about 30 to 35.

3. A product of the process of claim 1.

4. A process for preparing an aerated fat-containing food product comprising:
    mixing a fat with an edible fiber in amounts to obtain a mixture which contains a maximum of 30% by weight fat;
    refining the mixture to reduce a size of particles in the mixture to obtain a refined mixture wherein the particles have a maximum size of about 30 $\mu$m; and
    aerating the refined mixture.

5. A product of the process of claim 4.

6. A process according to claim 1 or 4 further comprising, prior to aerating, adding a vegetable fat having a melting point of at least 32° C. to the refined mixture to obtain a fat-added mixture wherein a total quantity of fat in 10 parts of the fat-added mixture is at least 3 parts and wherein at least 25% of the fat of the fat-added mixture is a vegetable fat having a melting point of at least 32° C.

7. A process according to claim 6 wherein the refined mixture is aerated at a temperature of from 20° C. to 25° C.

8. A process according to claim 7 wherein the fat and the fermented base are mixed at a temperature of from 40° C. to 60° C. and wherein the mixture is refined at a temperature of from 40° C. to 60° C.

9. A process according to claim 1 or 4 further comprising, during aerating, adding a vegetable fat having a melting point of at least 32° C. to the refined mixture to obtain a fat-added mixture wherein a total quantity of fat in 10 parts of the fat-added mixture is at least 3 parts and wherein at least 25% of the fat of the fat-added mixture is a vegetable fat having a melting point of at least 32° C.

10. A process according to claim 9 wherein the refined mixture is aerated at a temperature of from 20° C. to 25° C.

11. A process according to claim 10 wherein the fat and the fiber are mixed at a temperature of from 40° C. to 60° C. and wherein the mixture is refined at a temperature of from 40° C. to 60° C.

12. A process according to claim 1 or 4 wherein the refined mixture is aerated at a temperature of from 20° C. to 25° C.

13. A process according to claim 1 or 4 wherein the fat is selected from the group consisting of lactic fats and vegetable fats.

14. A food composition comprising an aerated mixture of a fat in an amount of from 30% to 95% by weight and a fermented base mix which comprises a fermented acidified milk-based material and a fermented hydrolyzed amylaceous material having a maximum particle size of 30 $\mu$m, the composition having an apparent density of from 700 g/l to 900 g/l.

15. A food composition according to claim 14 wherein the amylaceous material is a hydrolyzed cereal having a DE of from about 30 to 35.

16. A food composition according to claim 14 which contains, by weight, from 0.5 part to 3 parts lactic fat, from 0.5 part to 5 parts vegetable fat by weight and from 1 part to 3 parts fermented base mix.

17. A food composition comprising an aerated mixture of a fat in an amount of from 30% to 95% by weight and an edible fiber having a maximum particle size of 30 $\mu$m, the composition having an apparent density of from 700 g/l to 900 g/l.

18. A food composition according to claim 17 which contains, by weight, from 2 parts to 4 parts lactic fat, from 0.5 part to 2 parts vegetable fat and from 4 parts to 7 parts edible fiber.

19. A food composition according to claim 14 or 17 wherein the fat is selected from the group consisting of lactic fats and vegetable fats, wherein the composition contains at least 3 parts fat per 10 parts of the composition and wherein at least 25% of the fat is a vegetable fat having a melting point of at least 32° C.

20. A food composition according to claim 14 or 17 wherein the fat is a mixture of fats and wherein from 30% to 40% of the fats are solid at a temperature of from 20° C. to 25° C. and wherein from 60% to 70% of the fats are liquid at a temperature of from 20° C. to 25° C.

21. A food composition according to claim 14 or 17 wherein the fat is a mixture of fats and wherein from 85% to 95% of the fats are solid at a temperature of from 20° C. to 25° C. and wherein from 5% to 15% of the fats are liquid at a temperature of from 20° C. to 25° C.

22. A food composition according to claim 14 or 17 wherein the composition has a moisture content of less than 1% by weight.

* * * * *